United States Patent [19]
So et al.

[11] Patent Number: 4,709,414
[45] Date of Patent: Nov. 24, 1987

[54] OPTICAL FIBER ORDER WIRE SYSTEM

[75] Inventors: Vincent C. So; Paul J. Vella; David D. Clegg; Richard P. Hughes, all of Edmonton, Canada

[73] Assignee: Northern Telecom Limited, Montreal, Canada

[21] Appl. No.: 799,833

[22] Filed: Nov. 20, 1985

[30] Foreign Application Priority Data

Jun. 12, 1985 [CA] Canada .................................. 483730

[51] Int. Cl.$^4$ ............................................. H04B 9/00
[52] U.S. Cl. ....................................... 455/607; 370/3; 455/610; 455/612
[58] Field of Search ................... 370/1, 3, 2; 455/606, 455/607, 610, 612

[56] References Cited

U.S. PATENT DOCUMENTS 4,393,516  7/1983  Itani ..................................... 455/608

FOREIGN PATENT DOCUMENTS

| | | | |
|---|---|---|---|
| 3436135 | 4/1985 | Fed. Rep. of Germany ....... | 455/607 |
| 58-111449 | 7/1983 | Japan .................................... | 370/3 |
| 58-171138 | 10/1983 | Japan .................................... | 370/1 |

OTHER PUBLICATIONS

Coyne-Integrated Broadband Distribution-International Symposium on Subscriber Loops & Services-Atlanta, Ga.-20-24, Mar. 1978, pp. 44-48.

Anritsu Electric Co., Ltd. Cat. No. MS98A, "Optical Portable Telephone", 1984.

Plantronics, Wilcom brochure, "Model T347B Fiber Optic . . . ", 1984.

Tau-Tron brochure, "5490R Voicelink Fiber Communications Set".

Primary Examiner—Joseph A. Orsino, Jr.
Attorney, Agent, or Firm—Mitchell B. Wasson; Martin P. Hoffman; James McGraw

[57] ABSTRACT

An order wire system which can be used during installation and maintenance of an optical fiber communication system comprises an optical fiber order wire to which engineers can connect at remote sites communication sets each of which includes a microphone and earphone allowing the engineers to communicate with each other. Full duplex and multi-party operation can be achieved with the sets according to the invention and, because the signals are regenerated, the range of operation is considerable. Both analog and digital communication is contemplated and different specific circuits are proposed. In a typical analog configuration, the microphone output is fed to first and second frequency modulators operating respectively at first $f_1$ and second $f_2$ center frequencies. The outputs of the modulators are summed and passed to a laser driver and laser which is optically coupled both to the upstream and the downstream side of the order wire. Optical detectors are respectively connected to the upstream and downstream sides of the order wire and the outputs of these are fed through first and second bandpass filters to respective frequency demodulators. One of the filters passes only $f_1$ frequencies and the other only $f_2$ frequencies. The outputs of the demodulators are fed to the earphone and also back to the respective modulators for regeneration.

7 Claims, 14 Drawing Figures

OPTICAL FIBER ORDER WIRE SYSTEM

FIELD OF THE INVENTION

This invention relates to communication systems using optical fibers.

BACKGROUND OF THE INVENTION

For the installation of optical fiber communication systems it has been proposed to use a dedicated optical fiber cable known as an order wire which can be used during installation and maintenance of the system by the installing and maintenance company to test the system. Specifically at remote sites, engineers would connect to the order wire communication sets which include microphone and earphone whereby the engineers can communicate with each other.

Typically such communication sets operate on a half-duplex principle, i.e., one party talks while the other listens and vice versa. Also, only two parties can use the system at any one time. Finally, the received signal is not regenerated so that the range between sites is limited.

It is an object of the present invention to provide a communications set which overcomes one or more of the above disadvantages.

SUMMARY OF THE INVENTION

According to a first broad aspect of the present invention, there is provided a transceiver for use with an optical fiber communication system, comprising an audio input and an audio output, laser means optically connected to a downstream link and to an upstream link of an optical fiber forming part of the communication system, optical detector means optically connected to the downstream and upstream links, encoding and drive means connected between the audio input and the laser means and arranged to encode the audio input signal into a portion encoded according to a first code and a portion encoded according to a second code, the laser means being driven by both portions, decoding means connected between the optical detector means and the audio output and arranged to recover from the upstream link signals encoded according to the first code and to recover from the downstream link signals encoded according to the second code, and signal regeneration means connected between the decoding means and the encoding means whereby recovered signals are regenerated in their originally encoded form and mixed with new signals from the audio input.

According to a more specific aspect of the present invention, there is provided a transceiver for use with an optical fiber communication system, comprising an audio input and an audio output, a first optical connector for connection of the transceiver to a downstream link of an optical fiber forming part of the communication system and a second optical connector for connection of the transceiver to an upstream link of the optical fiber, a first frequency modulator and a second frequency modulator both connected to the audio input, the first modulator operating at a first centre frequency $f_1$ and the second modulator operating at a second centre frequency $f_2$, a first laser connected for modulation by the first modulator and optically connected to the first optical connector, a second laser connected for modulation by the second modulator and optically connected to the second optical connector, a first optical detector optically connected to the second optical connector and connected to a first demodulator having an output connected both to the audio output and to the first frequency modulator, a second optical detector optically connected to the first optical connector and connected to a second demodulator having an output connected both to the audio output and the second frequency modulator.

To avoid internal feedback, bandpass filters are connected before the demodulators, one stopping $f_2$ frequencies and the other stopping $f_1$ frequencies.

According to another aspect of the present invention, there is provided a transceiver for use with an optical fiber communication system, comprising an audio input and an audio output, a first optical connector for connection of the transceiver to a downstream link of an optical fiber forming part of the communication system and a second optical connector for connection of the transceiver to an upstream link of the optical fiber, a first frequency modulator and a second frequency modulator both connected to the audio input the first modulator operating at a first centre frequency $f_1$ and the second modulator operating at a second centre frequency $f_2$, a laser connected for modulation by both the first modulator and the second modulator and optically connected to both the first optical connector and the second optical connector, a first optical detector optically connected to the second optical connector and connected through a first filter means to a first demodulator having an output connected both to the audio output and to the first frequency modulator, the first filter means being arranged to pass frequencies substantially at $f_1$ and stop frequencies at $f_2$, a second optical detector optically connected to the first optical connector and connected through a second filter means to a second demodulator having an output connected to both the audio output and to the second frequency modulator, the second filter means being arranged to pass frequencies substantially at $f_2$ and stop frequencies at $f_1$.

In the aspect described in the preceding paragraph the filter means are necessary to proper operation because both $f_1$ and $f_2$ frequencies are transmitted both upstream and downstream.

In this arrangement, to minimize the effect of internal feedback a portion of the internal carrier signal is subtracted from the detected signal. This portion is adjustable to match the portion which is inadvertently fed back.

The invention also contemplates a digital, instead of an analog, system of communication, in which frequency upshifters and downshifters are used instead of the frequency modulators and demodulators and A/D and D/A converters are used as appropriate.

The invention will now be described in greater detail with reference to the accompanying drawings.

DETAILED DESCRIPTION OF PREFERRED EMBODIMENTS

Figure 1:
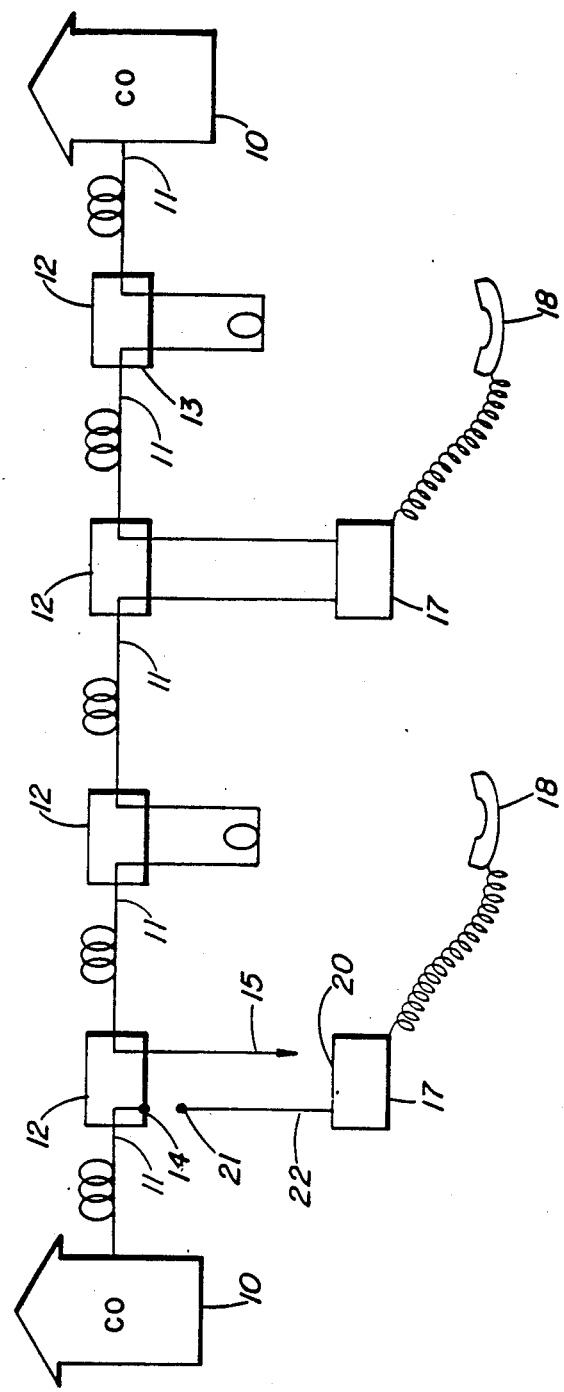
FIG. 1 is a schematic view of a fiber-optic cable order-wire system according to the invention.

With reference to FIG. 1 an order wire system is shown installed between two central offices 10. The system includes a dedicated optical fiber 11 which extends between the central offices 10, passing through splice enclosures 12 at predetermined locations on the way. Each splice enclosure includes a splice 13 comprising a first connector 14 terminating one portion of the optical fiber 11 and a second, mating connector 15, carried on the end of a fiber element 16 known as a pigtail which terminates an adjacent portion of the optical fiber 11. When connectors 14 and 15 are mated the respective splice 13 simply interconnects adjacent portions of the optical fiber 11. However, if it is desired to tap into the optical fiber at specific locations, one simply disconnects the connectors 14 and 15 at those locations and connects at these locations interface boxes 17 each of which has a voice communication handset 18. More specifically, each interface box 17 has a connector 20 adapted to mate with connector 15 and a connector 21 on the end of a pigtail fiber 22, which connector 21 is adapted to mate with connector 14.

Figure 2A:
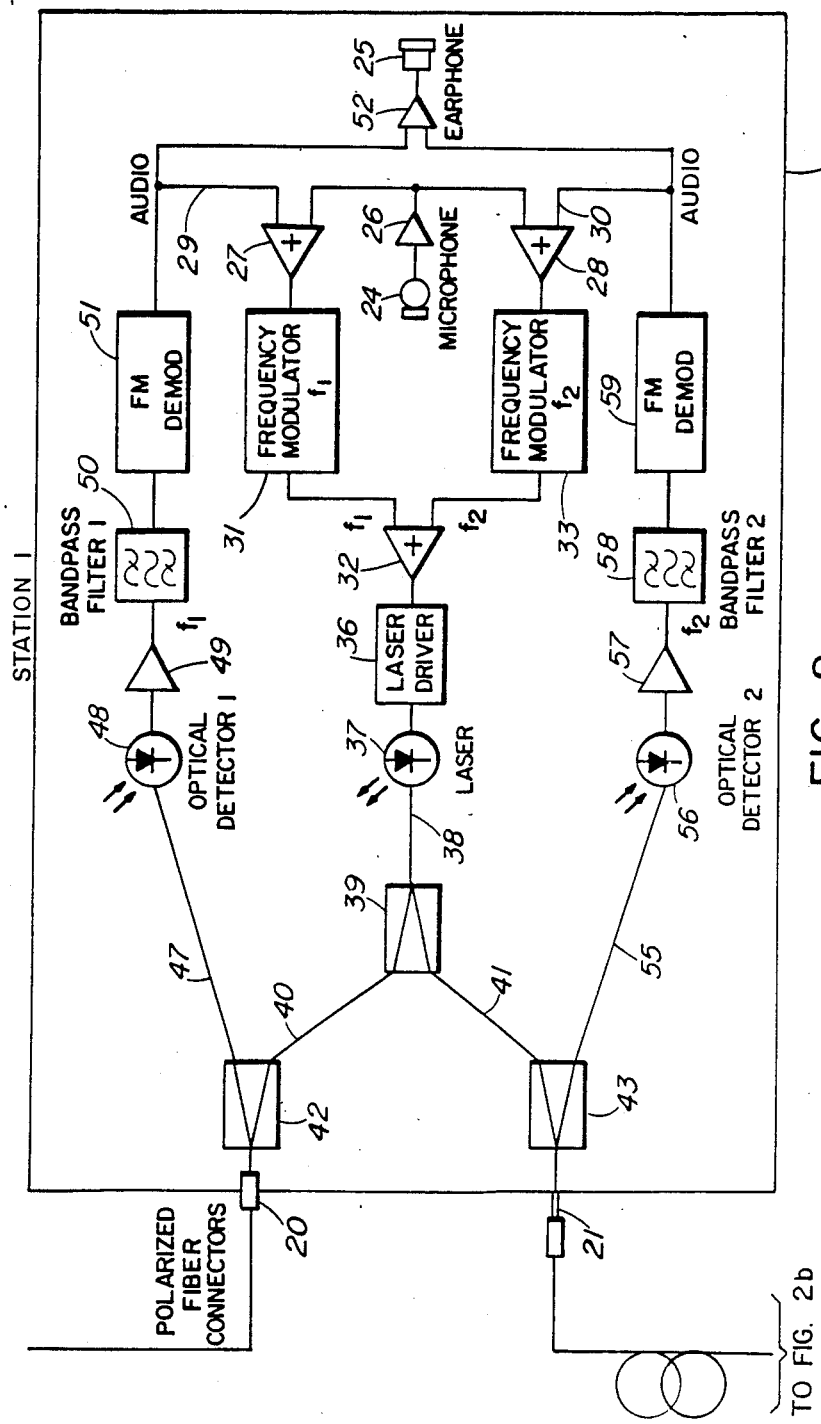
FIGS. 2(a), (b) and (c) together constitute a view of part of the system of FIG. 1 illustrating schematically the electrical components and interconnections in the interface boxes located at each of three stations.
Figure 2B:
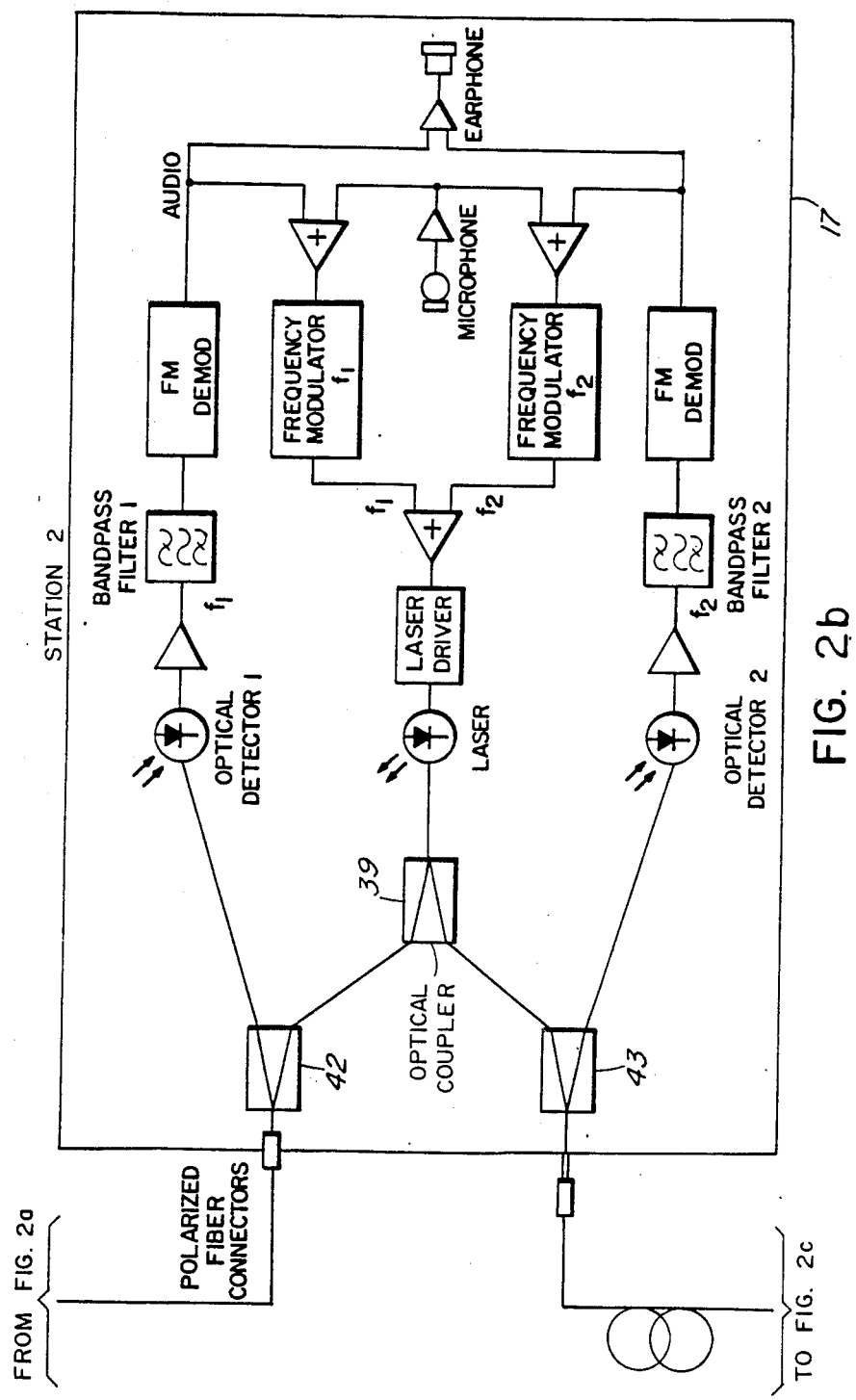
Figure 2C:
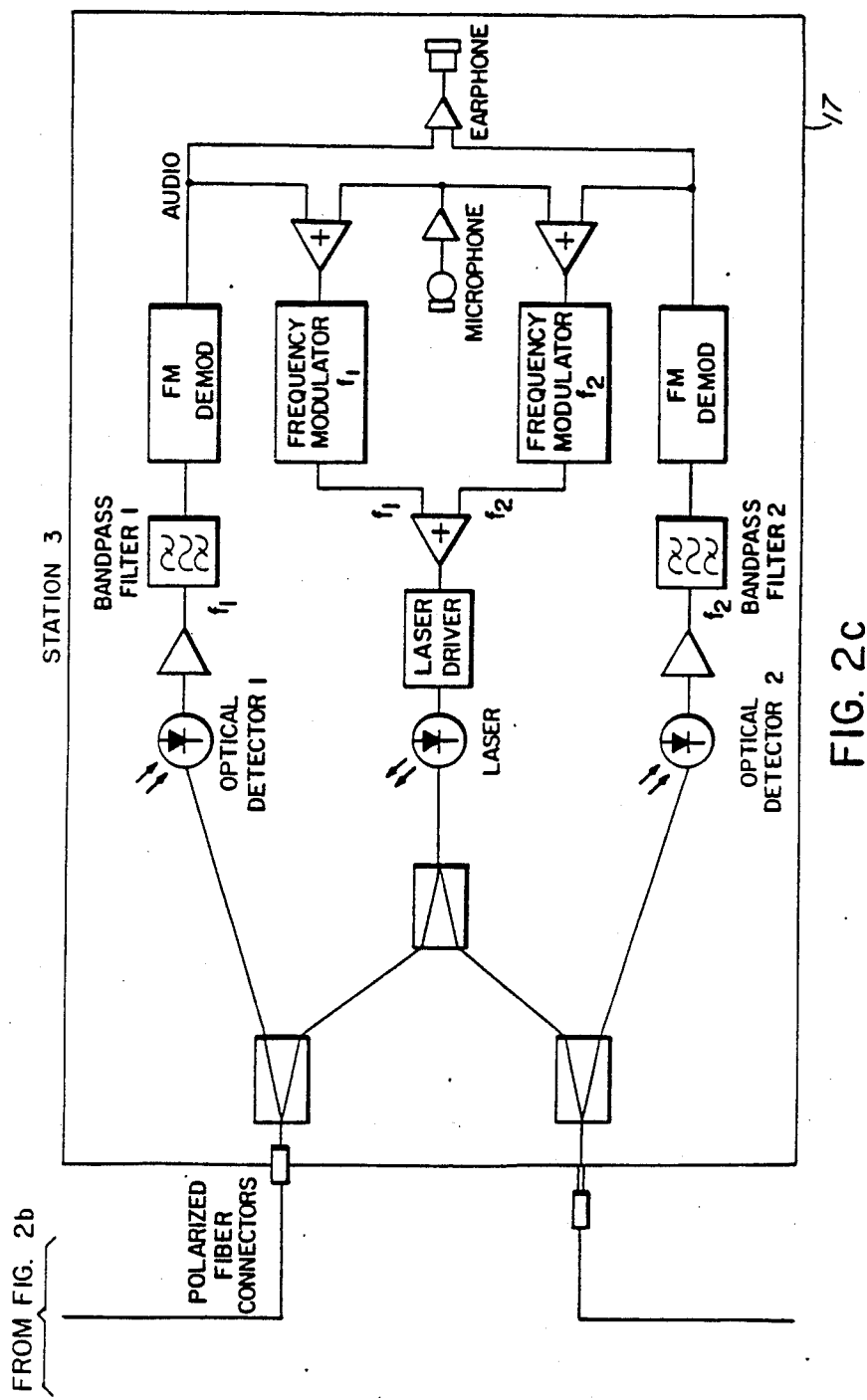

Three interface boxes 17 are shown schematically in FIG. 2, located at three different points along the order wire referred to as stations 1, 2 and 3. The handset 18 shown in FIG. 1 is illustrated in FIG. 2 as a separate microphone 24 and speaker or earphone 25. Microphone 24 is connected through an amplifier 26 to two adders 27 and 28 each of which also has an input connected to the audio output side via lines 29 and 30. The output of adder 27 is connected through a frequency modulator 31, which modulates at a first centre frequency $f_1$, to a first input of an adder 32 and the output of adder 28 is connected through a frequency modulator 33, which modulates at a second centre frequency $f_2$, to a second input of adder 32. It should be noted that $f_1$ and $f_2$ should not be related harmonically. In an experimental system $f_1$ was 48 KHz and $f_2$ was 75 KHz. Preferably, however, $f_1$ should not be less than 100 KHz and $f_2$ should be greater than 250 KHz.

The output of adder 32 is connected to a laser driver 36 which is connected to drive a laser 37, typically an L.E.D. The laser output is connected to an optical fiber 38 which is connected by an optical coupler 39 to two further optical fibers 40 and 41. Optical fiber 40 is connected through an optical coupler 42 to connector 20 for connection to the upstream side of optical fiber 11 and optical fiber 41 is connected through an optical coupler 43 to connector 21 for connection to the downstream side of optical fiber 11. Optical couplers 42 and 43 are singlemode - singlemode couplers each formed, for example, as a fused biconical coupler made of 2 singlemode fibers.

Optical coupler 42 also connects the upstream side of optical fiber 11 to a first input side comprising an optical fiber 47, an optical detector 48, an amplifier 49, a band pass filter 50 designed to pass frequency $f_1$ but not $f_2$ and an FM demodulator 51 the output of which is connected through an amplifier 52 to earphone 25. The output of demodulator 51 is also connected via line 29 to adder 27 as described above.

In a similar fashion, optical coupler 43 connects the downstream side of optical fiber 11 to a second input side comprising an optical fiber 55, an optical detector 56, an amplifier 57, a bandpass filter 58 designed to pass frequency $f_2$ but not $f_1$ and an FM demodulator 59 the output of which is connected through the amplifier 52 to earphone 25. The output of demodulator is also connected via line 30 to adder 28 as described above. A device suitable for use as detectors 48 and 56 at a wavelength of approximately 0.8 m is a Silicon PIN (P-Instrinic-N) photodiode or a Silicon APD (Avalanche Photodiode). For use at longer wavelengths of 1.3 m or 1.5 m, the detectors could each comprise a Germanium PIN photodiode, a Germanium APD or, because of its lower noise, a photodiode constructed from Indium Gallium Arsenide (In Ga As).

The operation of the system will be described from the point of view of station 2. When the operator speaks into microphone 24 the signal from the speaker frequency modulates the two frequencies $f_1$ and $f_2$ and this combined signal drives laser 37. Via couplers 39 and 42 the optical signal is coupled into the upstream fiber link and via couplers 39 and 43 the optical signal is coupled into the downstream fiber link.

Considering now the upstream link, the optical signal is coupled by optical coupler 43 in station 1 to optical detector 56 and converted into an electrical signal which is amplified and passed to bandpass filter 58 which passes frequency $f_2$ but filters out $f_1$. The filtered signal is then demodulated in demodulator 59 to drive earphone 25 via amplifier 52. The recovered demodulated signal also passes along line 30 to amplifier 28 and modulator 33 which regenerates the modulated centre frequency $f_2$. Laser 37 in station 1 regenerates the optical signal with centre frequency $f_2$ which via couplers 39, 42 and 43 is passed both upstream and downstream. For the upstream case, the process described above is repeated. For the downstream case, the optical signal at frequency $f_2$ from station 1 is passed through optical coupler 42 in station 2 and detected by optical detector 48. However, the resultant electrical signal is stopped by band pass filter 50 which is designed to block frequency $f_2$, thus preventing feedback from station 1 to station 2. Thus, only a signal modulated at centre frequency $f_2$ can travel upstream and only a signal modulated at centre frequency $f_1$ can travel downstream.

Figure 3:
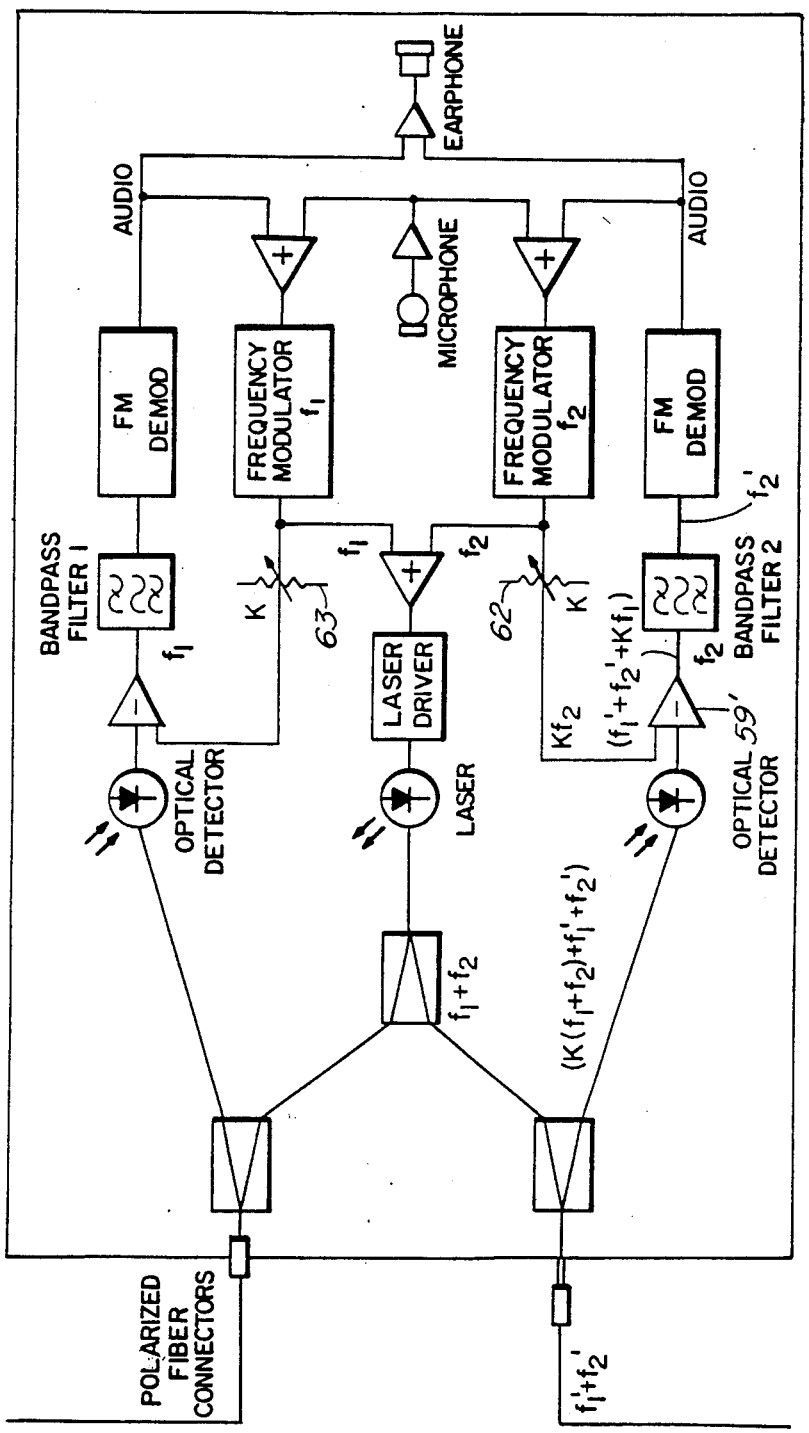
FIG. 3 is a schematic view illustrating a first modified version of interface box.

When using a single laser 37 modulated by both $f_1$ and $f_2$ a portion of the optical signal being sent out of an interface box 17 may be returned through the optical couplers 42 and 43. The way in which the effect of this undesirable feedback is minimized is illustrated in FIG. 3. The components and interconnections are identical to those in one of the interface boxes of FIG. 2 except for the following additional components and interconnections. Amplifier 59 of FIG. 2 is formed as a subtractor 59' having an inverting input connected to the output of $f_2$ modulator 33 through a potentiometer 62. In this way a selectable fraction K of the $f_2$ modulated signal used to drive laser 37 is subtracted in subtractor 59' from the signal detected in optical detector 56. This value K can be chosen to correspond to the fraction of the outgoing signal $f_1+f_2$ which is inadvertently coupled back to detector 56 by optical coupler 43.

As illustrated in FIG. 3, the signal which is being received from the downstream station at optical coupler 43 is designated $f_1'+f_2'$. After coupler 43 this becomes $K(f_1+f_2)+f_1'+f_2'$ because of the undesired feedback. After subtractor 59' the signal remaining is $f_1'+f_2'+Kf_1$ and so the output of the bandpass filter 58 is $f_2'$ which shows that the feedback has been removed, thereby increasing the carrier-to-noise ratio and increasing the range of operation.

In a similar fashion, amplifier 49 is replaced with subtractor 49' having an inverting input connected to the output of the $f_1$ modulator 31 through a potentiometer 63 so as to subtract $KF_1$ from the signal before it reaches bandpass filter 50.

Figure 4:
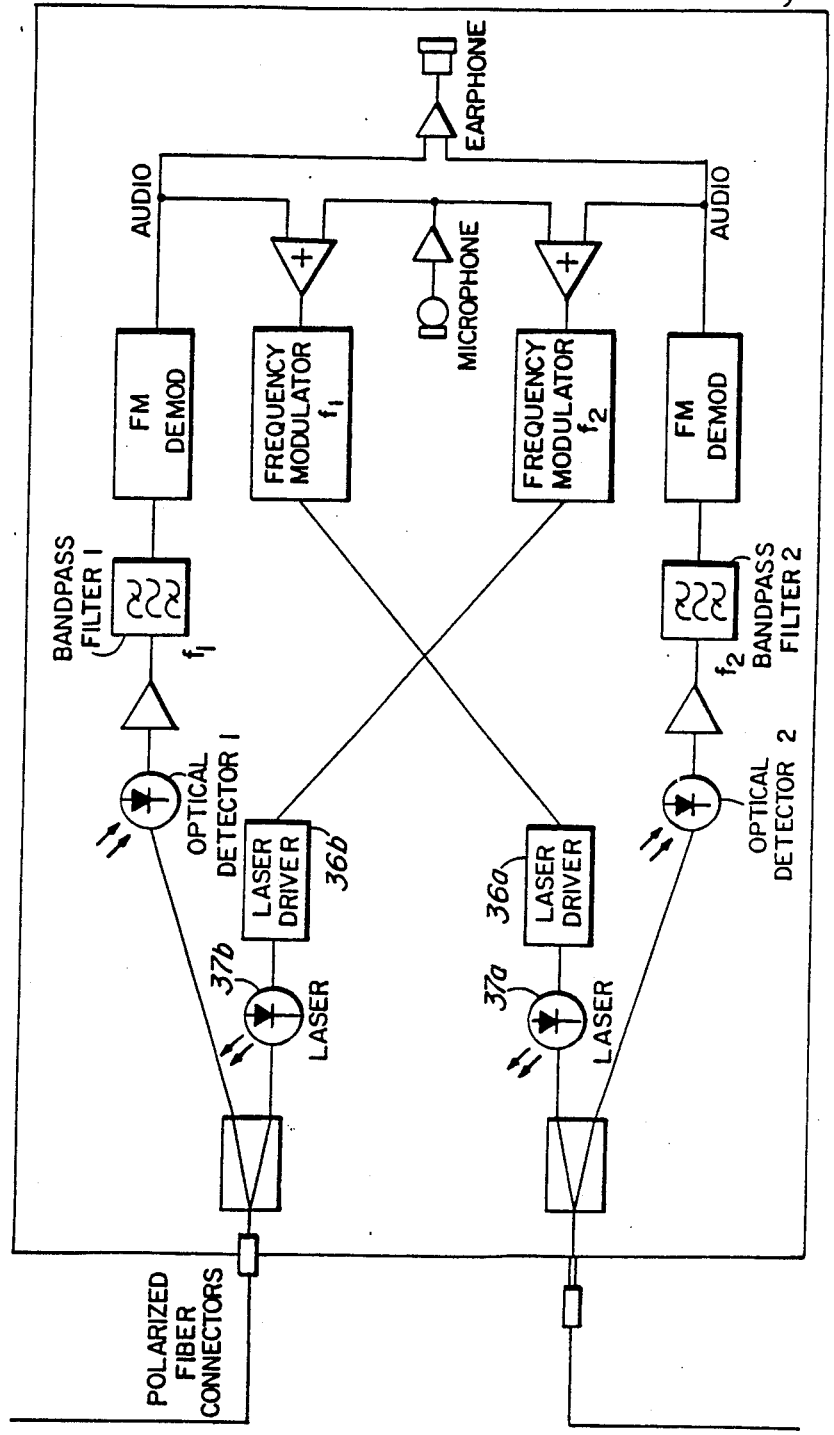
FIG. 4 is a schematic view illustrating a second modified version of interface box.

Instead of using a single laser, two separate lasers may be used, one modulated by $f_1$ and the other by $f_2$. This arrangement is illustrated in FIG. 4 in which most of the components and interconnections are unchanged from the FIG. 2 embodiment. The specific changes are that laser driver 36 and laser 37 are replaced with laser drivers 36a and 36b and lasers 37a and 37b. Adder 32 is dispensed with, the output of $f_1$ modulator 31 being connected directly to laser driver 36a, and the output of $f_2$ modulator 33 being connected directly to laser driver 36b. Optical coupler 39 is also dispensed with. In this arrangement, $f_1$ and $f_2$ are not both applied to both upstream and downstream links; only $f_2$ is applied to the upstream link and only $f_1$ applied to the downstream link. The bandpass filters in this case are used to remove internal feedback arising from the optical couplers and are not necessary to filter out directly received $f_1$ or $f_2$ signals.

It should be apparent from the above description that the transceiver of the present invention permits full duplex and multi-party operation and, since the incoming signal is regenerated at each station, it removes any limits on range providing the next station is less than −25 dB away.

Figure 5A:
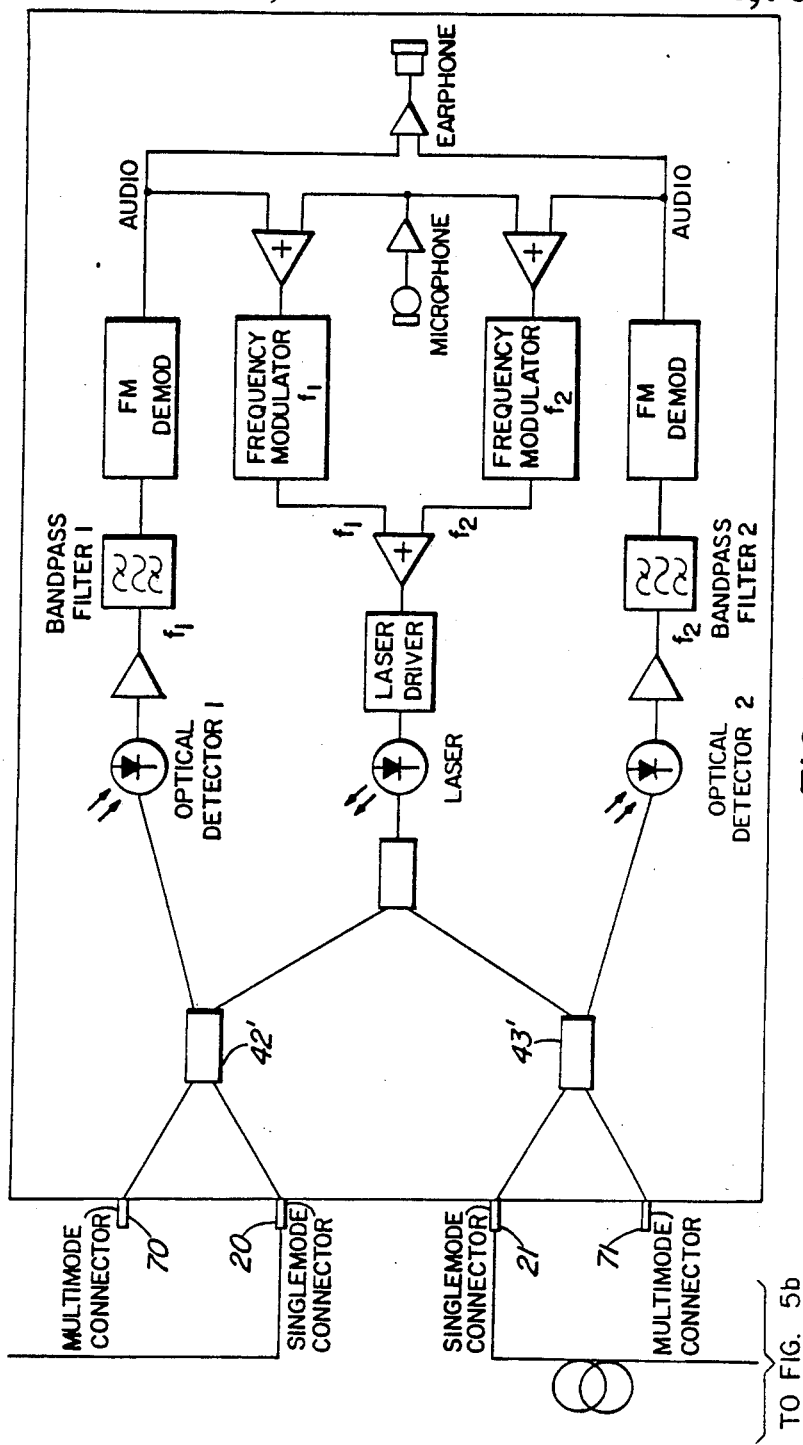
FIGS. 5(a), (b) and (c) constitute a view similar to FIG. 2 but showing a modified system according to the invention.
Figure 5B:
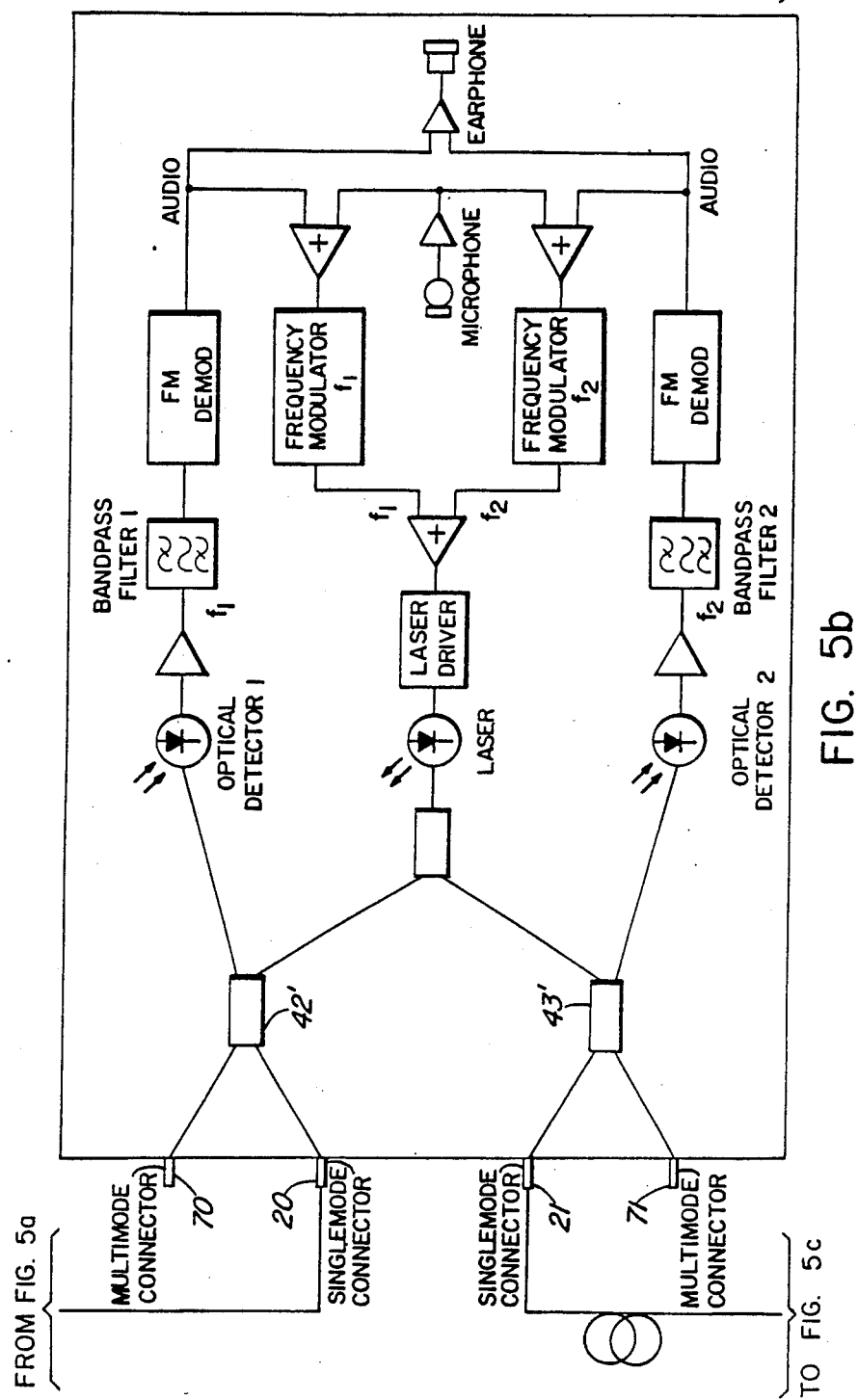
Figure 5C:
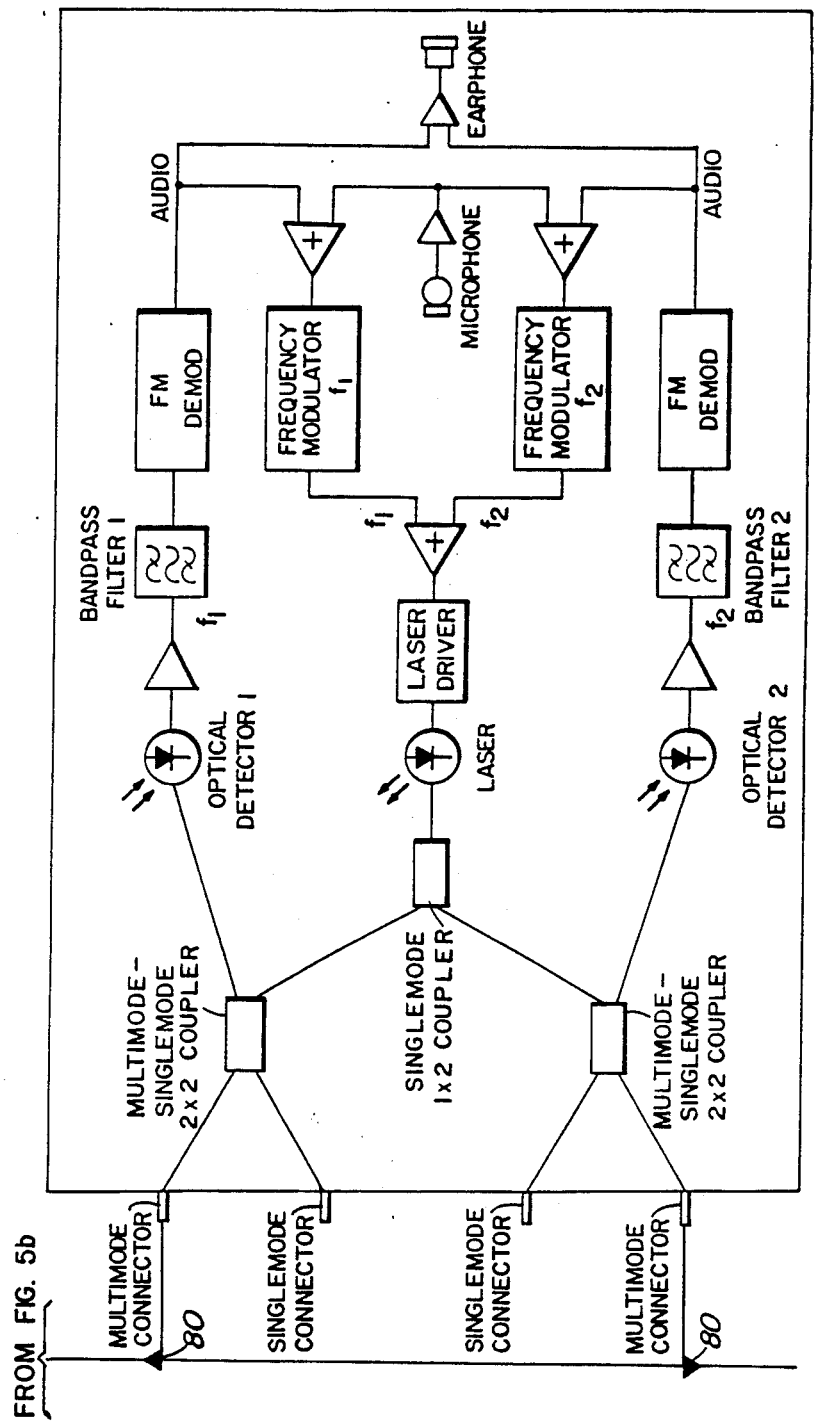

FIG. 5 illustrates a variation of the system shown in FIG. 2 which is adapted to access multimode fiber in addition to a singlemode fiber. The difference is that the 1×2 singlemode optical couplers 42 and 43 of FIG. 2 are replaced with 2×2 multimode-singlemode couplers 42' and 43'. One of the inputs of coupler 42' is connected to the upstream singlemode fiber and the other input is connected to the upstream multimode fiber (not shown) by means of appropriate connectors 20 and 70, respectively. One of the inputs of coupler 43' is connected to the downstream singlemode fiber and the other input is connected to the downstream multimode fiber (not shown) by means of appropriate connectors 21 and 71, respectively. Typically each multimode-singlemode coupler is a fused biconical coupler made of 1 singlemode and 1 multimode fiber. The remaining components may be identical to those described with reference to FIG. 2.

Figure 6A:
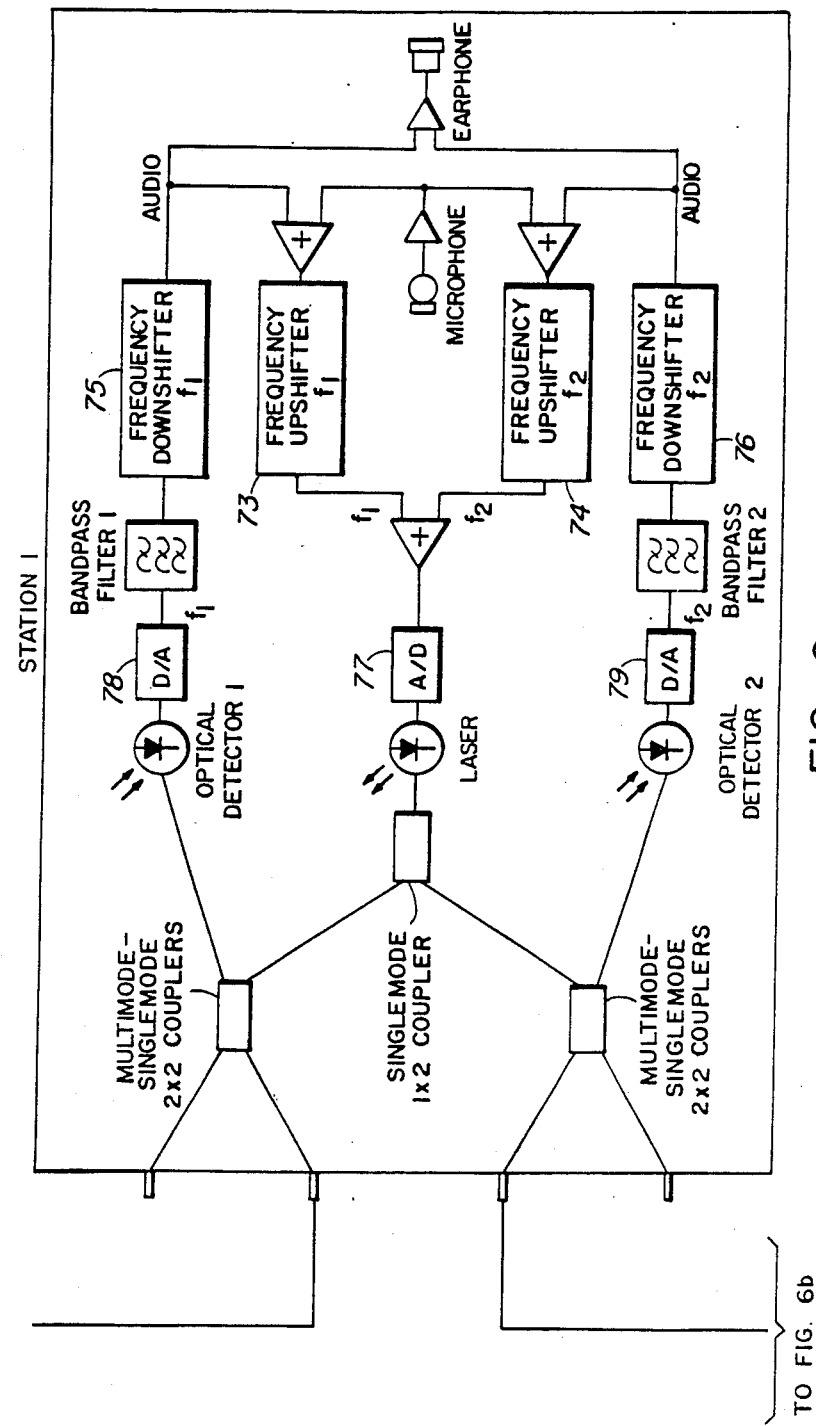
FIGS. 6(a), (b) and (c) constitute a view similar to FIGS. 2 and 5 but illustrating a digital system according to the invention.
Figure 6B:
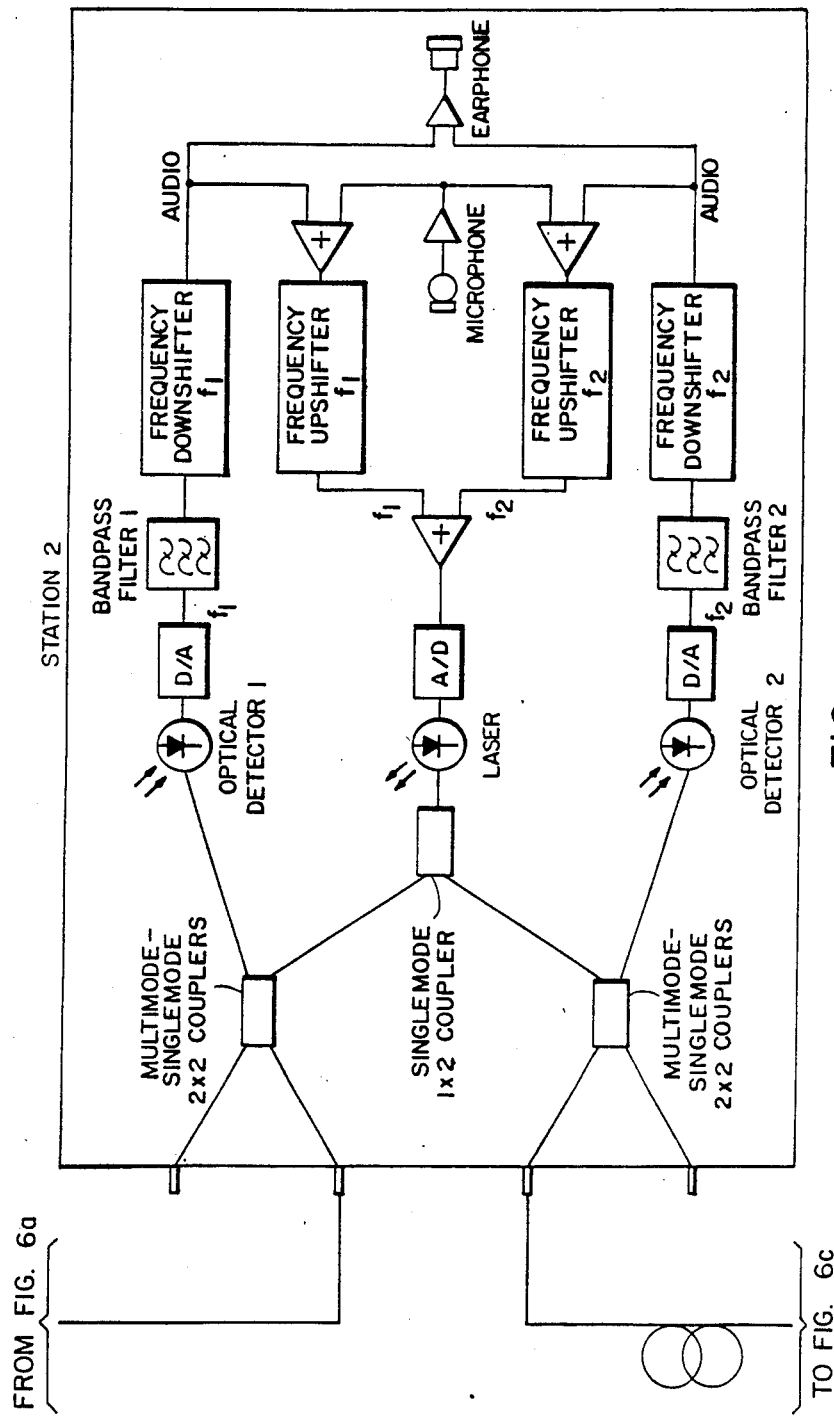
Figure 6C:
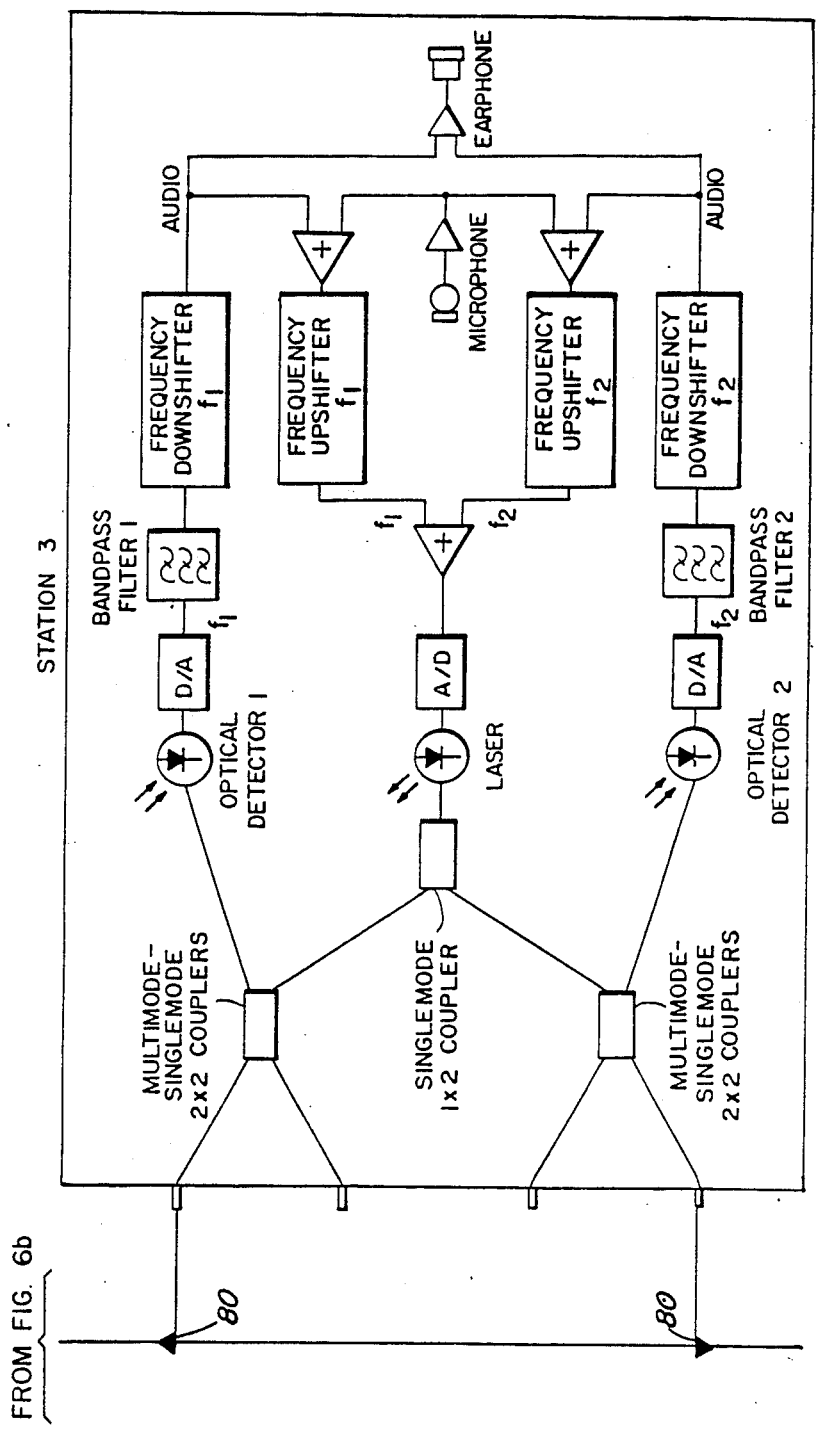

FIG. 6 illustrates a digital version of the system shown in FIGS. 2 and 5. The principal differences are the frequency modulators 31 and 33 and frequency demodulators 51 and 59 are replaced, respectively, with frequency upshifters 73 and 74 and frequency downshifters 75 and 76. Also the laser driver 36 is replaced with an A/D converter 77 and the amplifiers 49 and 59 are replaced with D/A converters 78 and 79. It is believed that a detailed description of this digital version is unnecessary and that the operation thereof will be readily apparent to those skilled in the art particularly in the light of the foregoing description of the analog version. Typical values for the two shift frequencies $f_1$ and $f_2$ are 0 and 5 KHz. The main advantages of the digital system are that it can sustain a loss of 36 dB instead of the 25 dB loss it can endure in the analog version and the system experiences no degradation when the signal is regenerated.

Also illustrated in FIGS. 5 and 6 are the fact that the interface boxes may be connected to the fibers either by splicing without connectors, or by means of connectors or what is termed local launch and detect. The last option involves retaining the integrity of the fiber and tapping into the fiber via diodes 80.

A digital version of the FIG. 4 circuitry is also contemplated. As with the FIG. 6 embodiment, the frequency modulators and demodulators would be replaced with frequency upshifters and downshifters, and amplifiers 49 and 59 would be replaced with D/A converters. The difference over the FIG. 6 embodiment would be that, because two lasers are used, there would be two A/D converters (in place of the laser drivers).

Figure 7:
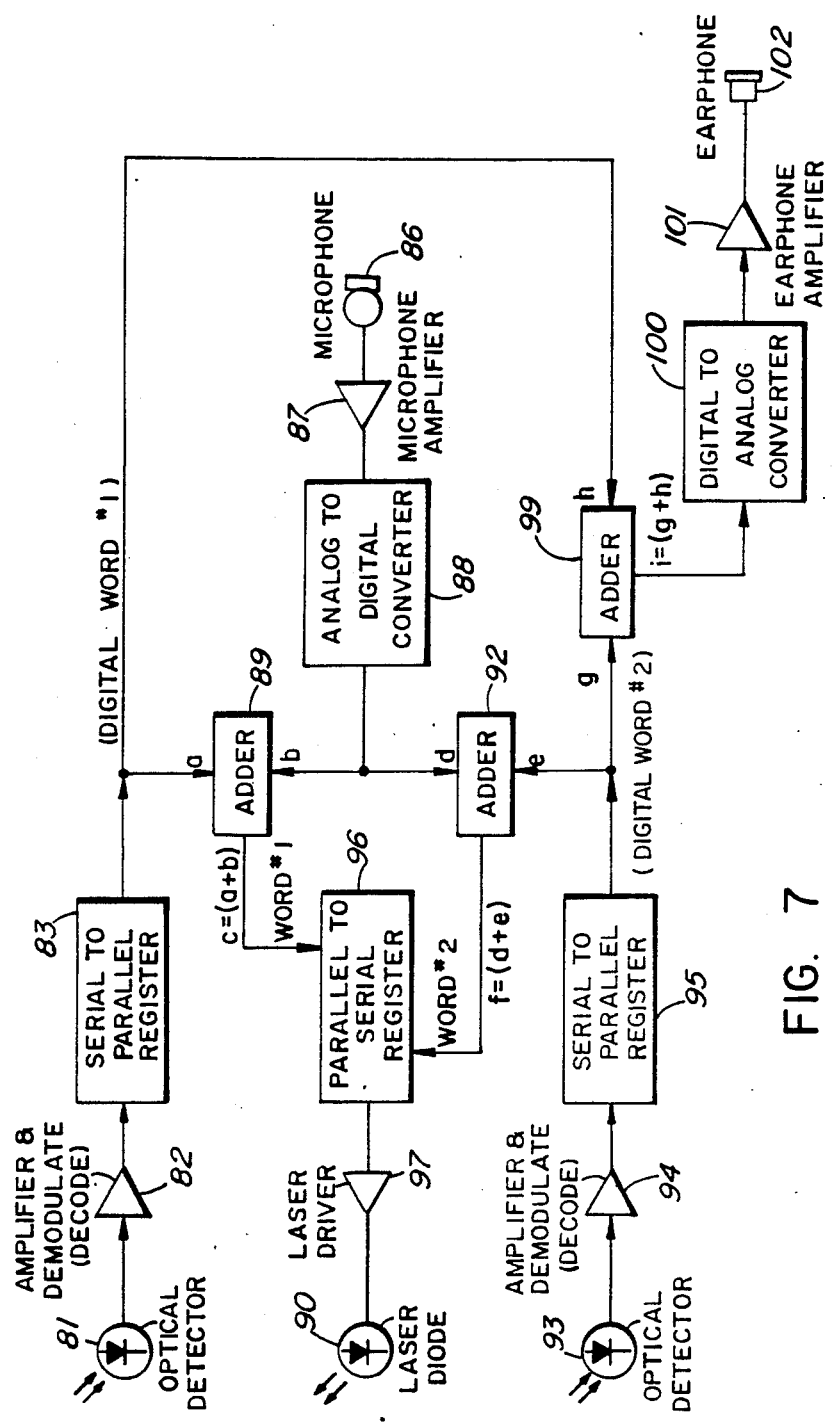
FIG. 7 is a schematic view illustrating the components of an interface box of a modified digital system.
Figure 8:
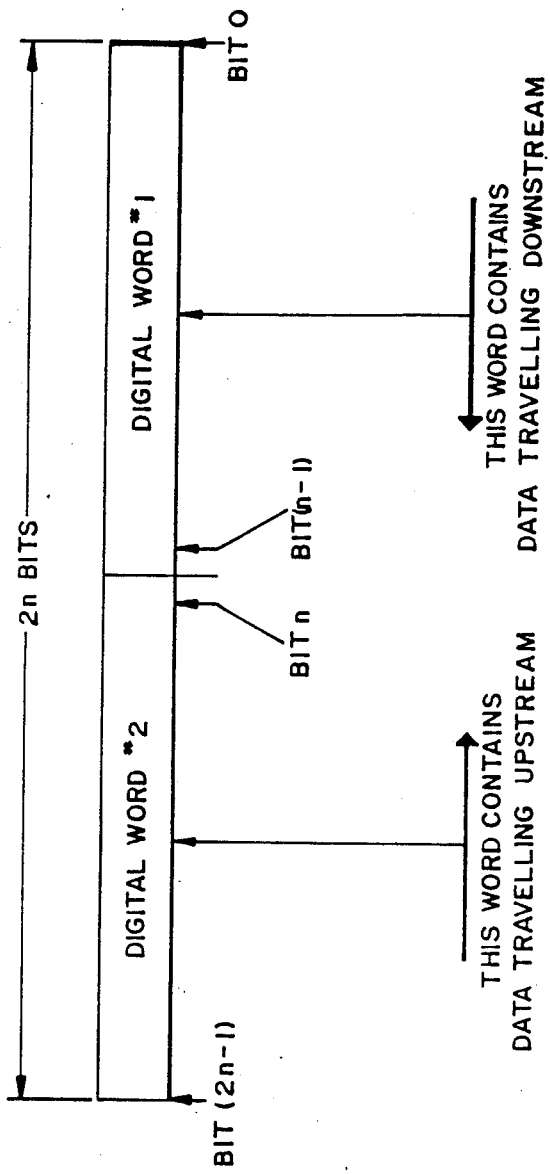
FIG. 8 is a diagram showing the arrangement of data words used in the system of FIG. 7.

The system illustrated in FIG. 7 is also a digital system but this represents a somewhat refined version of the basic digital system. In this system an audio signal is digitized, each sample consisting of n bits. As illustrated in FIG. 8, these n bits are assembled into a word 2 n bits long: bits 0 to n−1 convey data downstream in the order wire system and are called "Digital Word #1", while bits n to 2n−1 convey data upstream and are called "Digital Word #2".

With reference to FIG. 7 a serial bit stream is detected by optical detector 81 and, after amplification, decoding and removal of start, stop, parity bits and other necessary additional elements by block 82, the serial bit stream is converted by serial to parallel register 83 to a sequence of parallel primary words, i.e., Digital Word #1. Actually, register 83 will receive a block of 2n bits comprising Digital Words #1 and #2 but Digital Word #2 is "thrown away" i.e. nothing is done with it: only Digital Word #1 is used from this register.

The audio signal produced by microphone 86 is amplified by amplifier 87 and converted by A/D converter 88 to a sequence of parallel words each of n bits.

A digital adder 89 sums the digitized audio from the microphone and recovered Digital Word #1 to produce bits 0 to n−1 of the word which is to be transmitted by laser 90. Bits n to 2n−1 of the word to be transmitted are obtained by summing in an adder 92 the Digital Word #2, which is recovered from the digital signal detected by detector 93 and passed through amplifying and demodulating stage 94 and serial to parallel register 95, and the digitized audio from the microphone. As with register 83 only one of the two digital words is used from register 95, in this case Digital Word #2. Words #1 and #2 are combined in a parallel to series register 96 and passed to a laser driver 97 for driving laser diode 90.

Received Digital Words #1 and #2 are summed by adder 99, converted back to an analog signal by a D/A converter 100 and amplified by amplifier 101 for connection to earphone 102.

This system is a full duplex, multi-party system in which regeneration of data passed downstream and upstream is entirely digital. The significant difference between the system of FIG. 6 and that of FIG. 7 is that the former involves conversion from digital to analog (in D/A 78) after receipt of the transmitted signal and then reconversion back to digital (in A/D 77) and such conversion in both directions may give rise to some degradation of the signal. With the FIG. 7 embodiment, the signal to be regenerated remains as a digital signal and does not, therefore, suffer any degradation as a result of conversion and reconversion.

As with the other embodiments described, the FIG. 7 embodiment could be modified by providing two lasers somewhat in the manner shown in FIG. 4 with appropriate modifications in circuitry.

What we claim as our invention is:

1. A transceiver for use with an optical fiber communication system, comprising an audio input and an audio output, a first optical connector for connection of the transceiver to a downstream link of an optical fiber forming part of the communication system and a second optical connector for connection of the transceiver to an upstream link of the optical fiber, a first frequency modulator and a second frequency modulator both connected to the audio input, the first modulator operating at a first centre frequency $f_1$ and the second modulator operating at a second centre frequency $f_2$, a laser connected for modulation by both the first modulator and the second modulator and optically connected to both the first optical connector and the second optical connector, a first optical detector optically connected to the second optical connector and connected through a first filter means to a first frequency demodulator having an output connected both to the audio output and to the first frequency modulator, the first filter means being arranged to pass frequencies substantially at $f_1$ and stop frequencies at $f_2$, a second optical detector optically connected to the first optical connector and connected through a second filter means to a second demodulator having an output connected to both the audio output and to the second frequency modulator, the second filter means being arranged to pass frequencies substantially at $f_2$ and stop frequencies at $f_1$.

2. A transceiver as claimed in claim 1 including first means connected after the first optical detector and before the first demodulator for subtracting from the electrical signal derived by the first optical detector a portion of the output of the first modulator and second means connected after the second optical detector and before the second demodulator for subtracting from the electrical signal derived by the second optical detector a portion of the output of the second modulator.

3. A transceiver as claimed in claim 2 in which the first means for subtracting is located before the first filter means and the second means for subtracting is located before the second filter means.

4. A transceiver as claimed in claim 3 in which the first means for subtracting is a subtractor having a non-inverting input connected to an output of the first optical detector and an inverting input connected through a potentiometer to an output of the first modulator, and the second means for subtracting is a subtractor having a non-inverting input connected to an output of the second optical detector and an inverting input connected through a potentiometer to an output of the second modulator.

5. A transceiver for use with an optical fiber communication system, comprising an audio input and an audio output, a first optical connector for connection of the transceiver to a downstream link of an optical fiber forming part of the communication system and a second optical connector for connection of the transceiver to an upstream link of the optical fiber, a first frequency upshifter and a second frequency upshifter both connected to the audio input, the first frequency upshifter having a first shift frequency $f_1$ and the second frequency upshifter having a second shift frequency $f_2$, an adder having inputs driven by the first and second frequency upshifters and an output connected to an A/D converter connected to drive a laser which is optically connected to both the first optical connector and the second optical connector, a first optical detector optically connected to the second optical connector and connected through a first D/A converter and a first filter means to a first frequency downshifter having an output connected both to the audio output and to the first frequency upshifter, the first filter means being arranged to pass frequencies substantially at $f_1$ and stop frequencies at $f_2$, a second optical detector optically connected to the first optical connector and connected through a second D/A converter and a second filter means to a second frequency downshifter having an output connected both to the audio output and to the second frequency upshifter, the second filter means being arranged to pass frequencies substantially at $f_2$ and stop frequencies at $f_1$.

6. A transceiver as claimed in claim 5 including first means connected after the first optical detector and before the first downshifter for subtracting from the electrical signal derived by the first optical detector a portion of the output of the first upshifter and second means connected after the second optical detector and before the second downshifter for subtracting from the electrical signal derived by the second optical detector a portion of the output of the second upshifter.

7. A transceiver as claimed in claim 6 in which the first means for subtracting is located before the first filter means and the second means for subtracting is located before the second filter means.

* * * * *